United States Patent Office 3,646,157
Patented Feb. 29, 1972

3,646,157
THERMOPLASTIC COMPOSITIONS BASED ON POLYOLEFINES AND POLYAMIDES
Pierre Grosjean, Sainte-Foye-les-Lyon, and Alain Palsky, Caluire, Rhone, France, assignors to Societe Rhodiaceta, Paris, France
No Drawing. Filed Mar. 21, 1969, Ser. No. 809,384
Claims priority, application France, Mar. 22, 1968, 145,008
Int. Cl. C08g *41/04*
U.S. Cl. 260—857 L         3 Claims

ABSTRACT OF THE DISCLOSURE

Thermoplastic compositions consisting of polyolefines very finely dispersed in polyamides are made by dispersing the olefine in a diamine-dicarboxylic acid salt solution, and then simultaneously polymerizing the olefine and polycondensing the diamine and dicarboxylic acid by heating under pressure.

---

The present invention relates to thermoplastic compositions based on polyolefines and polyamides produced from diacids and diamines.

Attempts have for a long time been made to obtain easily shaped thermoplastic compositions from polymers of different properties which are incompatible in the fused state or in the solid state. In order that it should be possible to shape these compositions without difficulties in the molten state, and especially by extrusion, it is necessary for these compositions to be in the form of fine dispersions of one polymer in another.

In the cases of mixtures of polyamides and polyolefines attempts have been made to effect the mixing by malaxating the two preformed polymers in the molten state in a conventional device such as an extruder. Where the polyamide is the preponderant constituent of the mixture, however, only a coarse and irregular dispersion is obtained even after prolonged malaxating (with the polyolefine inclusions having a diameter of between 15 and 35 microns).

Attempts have been made to obtain finer dispersions by using either a modified polyolefine containing acid groups which by virtue of their ionic action produce finer inclusions of diameter less than or equal to 5 microns, or by incorporating into the starting mixture a diseprsing agent such as a fatty acid or an N-substituted copolyamide. However, the use of modified polymers or additional third substances generally adversely affect the physico-chemical characteristics of the resulting compositions compared with those of compositions prepared from the unmodified polyamide and polyolefine. Furthermore these processes necessitate an additional malaxating stage, which is frequently long and onerous, between the operations of preparing the polymer and of shaping the mixture.

It is also known to prepare mixtures of a polyamide and a polyolefine by adding a preformed polyolefine to the monomers from which the polyamide is made. By this process, rather irregular dispersions are obtained in which the diameter of the inclusions does not fall below 10 microns.

The present invention provides compositions based on two incompatible polymers, obtained in a single operation. They contain 50 to 99% by weight of a polyamide produced from at least one diacid and at least one di-primary diamine and 50 to 1% by weight of a polyolefine, the said polyolefine being dispersed as a discontinuous phase in the form of particles of average diameter less than 5 microns, and preferably less than 3 microns, in the said polyamide as continuous phase.

Where the polyolefine constituent is present in the mixture in small amounts, the softening point and the behaviour in the molten state of the compositions of the invention are very close to those of the base polyamide, and the compositions can be easily shaped on devices, and in accordance with processes, usually employed for polyamides.

As the percentage of polyolefine in the composition increases, certain physico-chemical characteristics change, in particular the impact resistance, and the moisture uptake.

The polyamide constituent of the compositions according to the invention is preferably polyhexamethylene adipamide but it is also possible to use, for example, other polyadipamides or polysebacamides, polyazelamides, or polyterephthalamides.

The salts which form the polyamides and which can be used in the present invention are produced from essentially equimolecular amounts of diacids of formula:

$$HOOC\text{---}R^1\text{---}COOH$$

in which $R^1$ is a divalent aliphatic, cycloaliphatic, aromatic or aralphatic optionally substituted hydrocarbon radical, and of di-primary diamines of formula:

$$H_2N\text{---}R^2\text{---}NH_2$$

in which $R^2$ is a divalent aliphatic, cycloaliphatic or aralphatic optionally substituted hydrocarbon radical. In general the preferred polyamides are substantially linear, fibre-forming polyamides consisting essentially of units of the formula:

$$\text{\textlbrackdbl}CO\text{---}R^1\text{---}CO\text{---}NH\text{---}R^2\text{---}NH\text{\textrbrackdbl}$$

where $R^1$ is polymethylene of 4 to 8 carbon atoms and $R^2$ is polymethylene of 2 to 10 carbon atoms or p-phenylene, $R^1$ and $R^2$ together containing at least 8 carbon atoms.

The polyolefine constituent is generally a polymer of at least one α-ethylenic (aliphatic, linear or branched cycloaliphatic or aralphatic) hydrocarbon having more than 4 carbon atoms or of a diethylenic hydrocarbon possessing conjugated double bonds. Preferred such polyolefines are the substantially linear polymers or copolymers of an olefine of the formula:

$$R^3\text{---}\underset{\underset{R^4}{|}}{C}=CH\text{---}R^5$$

where $R^3$ is alkyl of 3 to 16 carbon atoms, phenyl, phenyl-(lower alkyl) or (lower alkyl)phenyl, and $R^4$ and $R^5$ are each hydrogen or lower alkyl, or $R^3$ and $R^5$ together make up a polymethylene chain of 3 to 8 carbon atoms, which is unsubstituted or substituted by lower alky, and/or of a diolefine of the formula:

$$R^6\text{---}CH=\underset{\underset{R^7}{|}}{C}\text{---}CH=CH\text{---}R^8$$

where $R^6$, $R^7$ and $R^8$ are each hydrogen or lower alkyl or $R^6$ and $R^8$ together make up a polymethylene chain of 1 to 8 carbon atoms.

The ethylenic monomers used must be capable of polymerising, in the presence of a catalyst if necessary, in an aqueous medium at a temperature of between 20° and 320° C. and under a pressure of less than 50 kg./cm.².  By way of example there may be quoted the polymers and copolymers of styrene, of α-methylstyrene, of vinyltoluene, of cyclohexene, of cyclopentadiene, of 1,3-cyclooctadiene, of 1-hexadecene, of 1-dodecene, of 1-nonene, of 1-hexene, of 2-methylbutadiene, or of 1-phenyl-2-butene.

The compositions of the invention are prepared by heating a dispersion of at least one olefinic monomer corresponding to the desired polyolefine in an aqueous solution of the salt or salts of at least one diacid with at least one di-primary diamine, to from 180° C. to 320° C. under a pressure of 10 to 50 kg./cm.² with removal of water to effect simultaneous polymerization and polycondensation. During the heating, the polymerization of the olefinic compound and the polycondensation of the salt which forms the polyamide take place simultaneously. The process may be operated continuously or discontinuously. The concentration of the aqueous salt solution in which the ethylenic monomer is dispersed should be from 20 to 85% by weight.

In certain cases it is possible, in order to favour the polymerization of the ethylenic monomer, to add to the reaction mixture a catalyst such as a peroxide, azodiisobutyronitrile, or a redox system, and to vary the temperature and pressure conditions or the duration of one of the phases of the operation, in particular where there is danger of a part of the olefinic monomer being stripped off during the removal of the water.

The new process makes it possible to prepare the compositions of the invention in a single operation, renders the malaxating of the constituents on which the mixture is based superfluous, and does not cause any physico-chemical interaction between the constituents, as can be easily verified by isolating these constituents, for example by dissolving one of them.

Fillers, pigments, dyestuffs or stabilizers are optionally added to the aqueous starting solution.

The following examples illustrate the invention. In these examples, the viscosity in the molten state is measured according to Standard Specification ASTM D 1238 62 T, in which the condition K has been modified to 285° C. in place of 275° C. after 15 minutes fusion. The softening temperatures are measured on the Townsend and Crowther apparatus. The molecular weights of the polyolefines are determined viscometrically.

EXAMPLE 1

The following are introduced into a stainless steel autoclave which has beforehand been purged with a stream of nitrogen:

5,240 g. of a 50% by weight aqueous solution of hexamethylene diammonium adipate;

4.5 g. of pure acetic acid as viscosity stabilizer for the polyamide; and 250 g. of freshly distilled styrene.

The pressure in the autoclave is slowly raised to 18 kg./cm.² and the temperature to 220° C. This pressure is kept constant, while the water is removed from the reaction mixture by distillation during the course of about one hour. The pressure is then progressively reduced to atmospheric pressure over the course of about 90 minutes while the temperature reaches 280° C. The polymer composition is kept under these conditions for one hour. It then has a sufficient viscosity in the molten state to be extruded in the form of a thin rod which is cooled and cut into granules.

The polymer composition obtained has a viscosity in the molten state of 1,460 Po and a softening point of 265° C. Microscopic examination of the composition shows that the polyolefine phase is finely and regularly dispersed in the polyamide in the form of inclusions of average diameter about 4 microns.

The absence of physico-chemical interaction between the base constituents of the mixture is demonstrated by checking, on the one hand, the amount of styrene suspended in the water distilled from the reaction mixture by extracting the styrene with ether, and, on the other hand, the amount of polystyrene present in the polymer composition. These two amounts correspond to the total styrene employed, which would not be the case if copolymers were formed.

To measure the amount of polystyrene in the mixture, the polyamide phase is dissolved in formic acid, and the polystyrene residue is isolated by dissolving in tetrahydrofuran, filtering the solution, and reprecipitating the polystyrene with water. The polystyrene is then washed with water, dried and weighed. Spectroscopic analysis of the polystyrene isolated by this process shows an infrared spectrum which agrees with the spectrum of reference polystyrene.

Comparative experiments

Polyamide-polystyrene mixtures are prepared according to known processes such as: (a) malaxating a preformed polyamide and a preformed polystyrene; or (b) incorporation of preformed polystyrene, of molecular weight comparable to that obtained in Example 1, in the solution of hexamethylene diammonium adipate, and polycondensation according to the conditions of Example 1. In case (a), microscopic examination shows a rather irregular distribution of the polyolefine inclusions, with their diameter varying from 15 to 25 microns. In case (b), the average diameter of the polyolefine inclusions is between 10 and 20 microns.

EXAMPLES 2–12

Additional experiments were carried out as in Example 1 and the following tables show the various conditions used. In Examples 1–6 styrene is used as the olefine monomer, and in Examples 7 to 12, various other olefine monomers are used.

TABLE I

| Example | 1 | 2 | 3 | 4 | 5 | 6 |
|---|---|---|---|---|---|---|
| Hexamethylene diammonium adipate [a] (g.) | 5,240 | 5,240 | 5,240 | 5,240 | 5,240 | 5,240 |
| Pure acetic acid (g.) | 4.5 | 4.5 | 4.5 | 4.5 | 4.5 | 4.5 |
| Styrene (g.) | 252 | 252 | 252 | 565 | 565 | 1,500 |
| Methyl ethyl ketone peroxide [b] (g.) | | | 4.5 | | | |
| Duration of the cycle at 220° C. under 18 kg./cm.² [c] (hours) | | 1 | 1 | | 1 | |
| Melt viscosity (poises) | 1,460 | 2,820 | 2,500 | 1,250 | 2,750 | 1,360 |
| Softening point (° C.) | 265 | 265 | 265 | 265 | 265 | 264 |
| Diameter of the polystyrene inclusions (microns) | 4 | 3 | ≤1 | 5 | 4 | 5 |
| Molecular weight of the polystyrene | 85,000 | 100,000 | | 80,000 | 110,000 | |

See footnotes at end of Table II.

TABLE II

| Example | 7 | 8 | 9 | 10 | 11 | 12 |
|---|---|---|---|---|---|---|
| Hexamethylene diammonium adipate [a] (g.) | 4,192 | 4,192 | 5,240 | 4,200 | 4,200 | 4,200 |
| Pure acetic acid (g.) | 3.6 | 3.6 | 4.5 | 4.5 | 3.6 | 3.6 |
| Ethylene monomers (g.) | 1-dodecene (78), styrene (16) | Cyclohexene (66.5), styrene (28.5) | 1-hexadecene (79), styrene (50) | Cyclooctadiene (98), styrene (31) | Cyclopentadiene (62), styrene (32.6) | Cyclopentadiene (95) |
| Methyl ethyl ketone peroxide [b] (g.) | | | | | | 4.5 |
| Duration of the cycle at 220° C. under 18 kg/cm.² [c] (hours) | 1 | 1 | 1 | 1 | 1 | 1 |
| Softening point (° C.) | 265 | 265 | 265 | 265 | 265 | 265 |
| Melt viscosity (poises) | 1,575 | 3,200 | 2,640 | 1,950 | 1,480 | 1,550 |
| Diameter of the polystyrene inclusions (microns) | 3–4 | 3 | 4 | <3 | 2.5 | 2.5 |

[a] 50% strength by weight aqueous solution.
[b] Polymerisation catalyst for the ethylenic compound.
[c] Before distillation.

We claim:
1. Process for the preparation of a thermoplastic composition comprising 50 to 99% by weight of a substantially linear, fibre-forming polyamide consisting essentially of units of the formula:

$$\{CO-R^1-CO-NH-R^2-NH\}$$

where $R^1$ is polymethylene of 4 to 8 carbon atoms and $R^2$ is polymethylene of 2 to 10 carbon atoms or p-phenylene, $R^1$ and $R^2$ together containing at least 8 carbon atoms and 50 to 1% by weight of a substantially linear polymer or copolymer of an olefine of the formula:

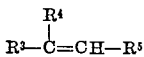

where $R^3$ is alkyl of 3 to 16 carbon atoms, phenyl, phenyl (lower alkyl) or (lower alkyl)phenyl, and $R^4$ and $R^5$ are each hydrogen or lower alkyl, or $R^3$ and $R^5$ together make up a polymethylene chain of 3 to 8 carbon atoms, which is unsubstituted or substituted by lower alkyl, and/or of a diolefine of the formula:

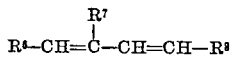

where $R^6$, $R^7$ and $R^8$ are each hydrogen or lower alkyl or $R^6$ and $R^8$ together make up a polymethylene chain of 1 to 8 carbon atoms, the said polyolefine being dispersed as a discontinuous phase in the form of particles less than 5 microns in diameter in the said polyamide as continuous phase which comprises heating a dispersion of at least one said olefine and/or diolefine in an aqueous solution of the salt or salts of at least one diacid of the formula HOCO—$R^1$—COOH with at least one di-primary diamine of the formula $H_2N$—$R^2$—$NH_2$, to from 180° C. to 320° C. under a pressure of 10 to 50 kg./cm.² with removal of water to effect simultaneous polymerisation and polycondensation.

2. Process according to claim 1 in which the concentration of the said salt or salts in the said aqueous solution is from 20% to 85% by weight.

3. Process according to claim 1 in which the said solution also contains a catalyst to promote the polymerization of the said olefine and/or diolefine.

References Cited

UNITED STATES PATENTS

| | | | |
|---|---|---|---|
| 2,249,686 | 7/1941 | Dykstra | 260—857 |
| 2,550,650 | 4/1951 | Arnold | 260—857 |
| 2,820,770 | 1/1958 | Adams | 260—857 |
| 3,243,478 | 3/1966 | Seeling | 260—857 |
| 3,330,889 | 7/1967 | Fukushima | 260—857 |
| 3,359,344 | 12/1967 | Fukushima | 260—857 |
| 3,496,985 | 2/1970 | Werner | 260—857 |
| 3,499,884 | 3/1970 | Wood | 260—94.9 |

FOREIGN PATENTS

| | | | |
|---|---|---|---|
| 740,501 | 8/1966 | Canada | 260—857 |
| 6,618,085 | 6/1967 | Netherlands | 260—857 |

PAUL LIEBERMAN, Primary Examiner

U.S. Cl. X.R.

260—78 R, 857 D, 857 UN